United States Patent [19]
Ziegler et al.

[11] Patent Number: 5,661,293
[45] Date of Patent: Aug. 26, 1997

[54] PHOTODIODE ARRAY WITH PHOTODIODE/ EXTRACTION DIODE COMBINATIONS WITH DARK CURRENT THEREOF REGULATED TO ZERO

[75] Inventors: Roland Ziegler; Rolf Lindner, both of Erlangen, Germany

[73] Assignee: Siemens Aktiengesellschaft, Munich, Germany

[21] Appl. No.: 547,289

[22] Filed: Oct. 24, 1995

[30] Foreign Application Priority Data

Nov. 7, 1994 [DE] Germany .......................... 44 39 759.3

[51] Int. Cl.⁶ .................................................. H01J 40/14
[52] U.S. Cl. .................... 250/214 C; 250/214 A; 327/515
[58] Field of Search ............... 250/214 A, 214 B, 250/214 C, 214 R, 208.1; 327/515

[56] References Cited

U.S. PATENT DOCUMENTS

| | | |
|---|---|---|
| 3,891,857 | 6/1975 | Wiklund .................. 250/559.15 |
| 4,341,956 | 7/1982 | Bax ........................ 250/214 C |
| 4,714,827 | 12/1987 | Akita . | |
| 4,916,307 | 4/1990 | Nishibe et al. ........... 250/214 C |
| 4,933,543 | 6/1990 | Hill ....................... 250/214 C |
| 5,296,697 | 3/1994 | Moses, Jr. . | |

FOREIGN PATENT DOCUMENTS 36 04 971  8/1987  Germany .

OTHER PUBLICATIONS

"Method of Compensating Dark Current Photodiode Arrays", Korth, IBM Technical Disclosure Bulletin, vol. 22, No. 8B, Jan. 1980.

*Primary Examiner*—Edward P. Westin
*Assistant Examiner*—Kevin Pyo
*Attorney, Agent, or Firm*—Hill, Steadman & Simpson

[57] ABSTRACT

A solid-state radiation detector, including a photodiode array, is suitable for use in computed tomography, with the dark current of the photodiodes being compensated. The compensation is accomplished by an adjustable voltage source connected to the photodiode, the voltage of the adjustable voltage source being set by a regulator so that the dark current becomes zero. The regulator receives a signal corresponding to the dark current from a measured value transducer in the form of a current-driven voltage source. The voltage supplied by the adjustable voltage source to the photodiode is maintained constant while x-rays are incident on the overall detector which cause illumination of the photodiode.

1 Claim, 1 Drawing Sheet

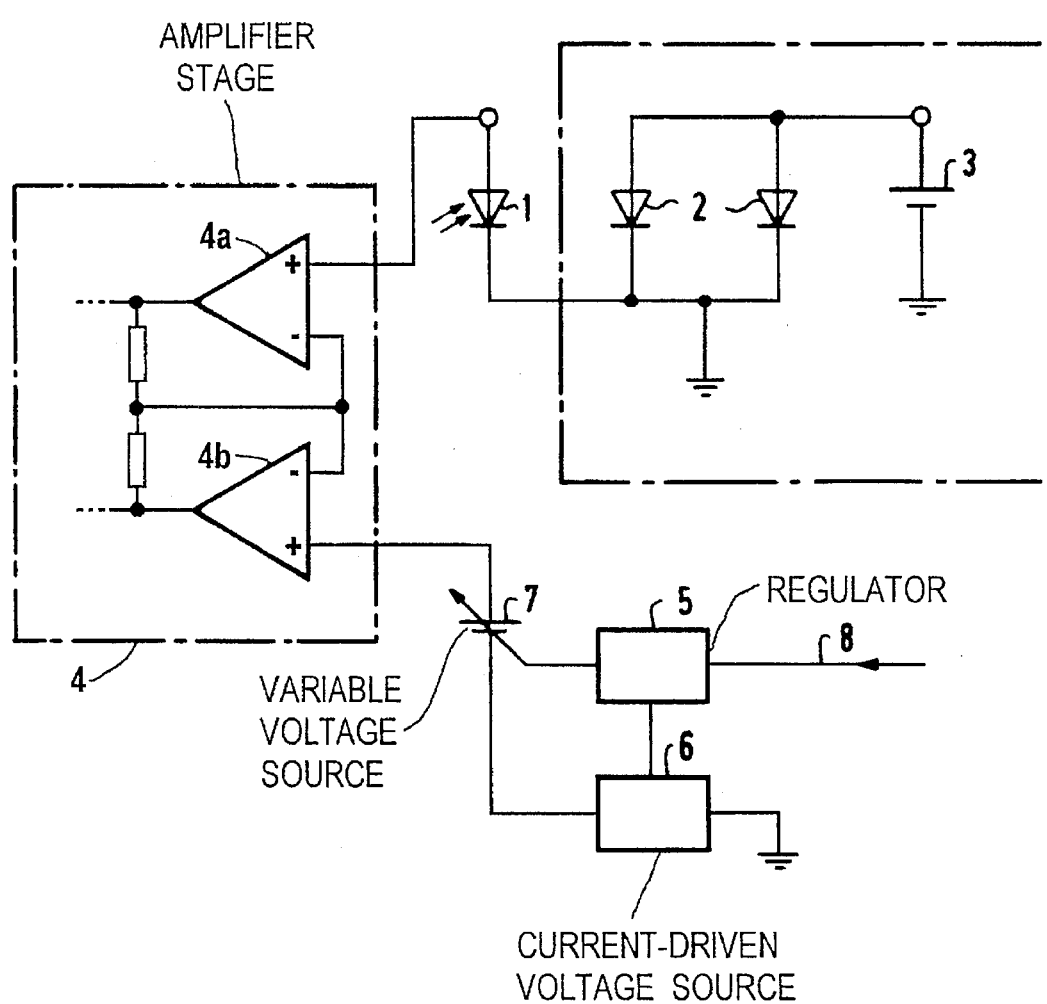

PHOTODIODE ARRAY WITH PHOTODIODE/ EXTRACTION DIODE COMBINATIONS WITH DARK CURRENT THEREOF REGULATED TO ZERO

BACKGROUND OF THE INVENTION

1. Field of the Invention

The present invention is directed to a photodiode array of the type suitable for use as a radiation detector.

2. Description of the Prior Art

Solid-state radiation detectors formed by a photodiode array are employed in x-ray computed tomography. Scintillators are disposed in front of the photodiodes of the array, the scintillators converting incident x-rays into visible light. The visible light is converted by the photodiodes into a corresponding electrical signal. In order to improve the signal quality, an extraction diode can be connected between each two neighboring photodiodes. The dark current of the photodiodes is thus dependent on the temperature and the voltage of the extraction diodes. The voltage for the extraction diodes is fixed for all of the extraction diodes, so as to compensate for the effects of the direct conversion of x-rays in the photodiodes into a contribution to the electrical output signal, as well as to compensate for optical cross-talk between photodiodes.

SUMMARY OF THE INVENTION

It is an object of the present invention to provide a photodiode array of the type described above wherein improved dark current compensation is achieved.

The above object is achieved in accordance with the principles of the present invention in a photodiode array having a number of individual photodiodes, with a voltage source connected to the photodiodes so that an adjustable voltage is present across each individual diode. The adjustable voltage is set by a regulator which receives a signal which is proportional to the dark current from a transducer which measures a parameter which is representative of the dark current. The voltage across each photodiode is adjusted as necessary during exposure of a photodiode to incoming radiation, so as to maintain the voltage constant during the exposure.

DESCRIPTION OF THE DRAWINGS

FIG. 1 is a schematic circuit diagram of a photodiode array and operating circuitry constructed in accordance with the principles of the present invention.

DESCRIPTION OF THE PREFERRED EMBODIMENTS

In the photodiode array and operating circuitry shown in the drawing, a photodiode 1 has extraction diodes 2 allocated thereto. The extraction diodes 2 are connected in parallel, and are followed by a further photodiode constructed on the same substrate as the photodiode 1 and the extraction diodes 2. The extraction diodes 2 are connected across an extraction voltage source 3. The photodiode 1 produces an electrical signal in a known manner as a result of light being incident thereon which is produced by, for example, a scintillator which has been exposed to x-rays. The electrical signal generated by the photodiode 1 is supplied to a data processing system (not shown) via a floating ground amplifier stage 4 containing one or more pairs of connected amplifiers such as 4a and 4b. The output of the amplifier stage 4 leads to a current meter in the processing stage.

A regulator 5 is connected to a current-driven voltage source 6 functioning as a measured value converter. The regulator 5 and the current-voltage source 6 are both connected to a variable voltage source 7, connected to the amplifier stage 4 for compensating the dark current.

The dark current can be completely compensated by applying the voltage of the voltage source 7 to the photodiode 1 via the amplifier stage 4. The current-driven voltage source 6 generates a signal proportional to the dark current which is supplied to the regulator 5. The regulator 5 sets the voltage of the variable source 7 and thereby compensates the dark current. The regulator 5 has a hold function (time t<2 min.). The voltage of the variable voltage source 7 must be maintained constant while x-rays are incident on the scintillator and the light generated thereby illuminates the photodiode 1. A hold signal is supplied at an input 8 to the regulator 5 when this occurs.

In a scintillator-photodiode detector, the automatic single-channel regulation shown in the drawing compensates for the dark current, and thus permits the full dynamic range of the photodiode 1 to be utilized. The circuit also renders the overall detector substantially insensitive to fluctuations in operating temperature, and serves to "level" temperature differences which may arise locally in individual detector areas. The circuit also prevents relatively small fluctuations in the extraction voltage from having any influence on the detector operation. The circuit also significantly reduces the influence of statistical scatter in the electrical properties of the various photodiodes 1 which are used within the array, and also minimizes the impact of statistical scatter in the properties of overall arrays. The circuit saves time in the overall detection procedure by avoiding the need to make repeated offset measurements, each of which has a measurement time associated therewith.

The automatic single-channel regulation disclosed herein thereby assures stable electrical separation of the individual channels, results in an optimum reduction of the direct conversion, and reliably produces a stable offset measurement thereby precluding the need to undertake such an offset measurement before each exposure.

Although modifications and changes may be suggested by those skilled in the art, it is the intention of the inventors to embody within the patent warranted hereon all changes and modifications as reasonably and properly come within the scope of their contribution to the art.

We claim as our invention:

1. A solid-state radiation image detector comprising:

a photodiode array containing a plurality of photodiodes and a plurality of extraction diodes, said extraction diodes respectively connected to said photodiodes thereby forming a plurality of photodiode/extraction diode combinations, each photodiode/extraction diode combination having a dark current associated therewith;

an adjustable voltage source connected to each photodiode/extraction diode combination, said voltage source having a voltage associated therewith;

means for generating a signal proportional to the dark current; and regulator means supplied with said signal proportional to the dark current for regulating the voltage of said adjustable voltage source dependent on said signal proportional to the dark current for maintaining a voltage across the photodiode/extraction diode combination connected to the adjustable voltage source constant during optical irradiation of that photodiode for regulating said dark current to zero.

* * * * *